United States Patent
Welch et al.

(10) Patent No.: US 6,436,525 B1
(45) Date of Patent: Aug. 20, 2002

(54) POLYANHYDRIDE PHOTOCHROMIC COATING COMPOSITION AND PHOTOCHROMIC ARTICLES

(75) Inventors: Cletus N. Welch, Murrysville; Robert W. Walters, Pittsburgh; Shanti Swarup, Allison Park, all of PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 09/209,731

(22) Filed: Dec. 11, 1998

(51) Int. Cl.[7] .............................. B32B 9/04; G02B 5/23; G02C 7/02; C08G 63/02; C08G 63/18
(52) U.S. Cl. ...................... 428/332; 428/426; 428/457; 428/537.1; 428/537.5; 428/411.1; 528/195; 528/198; 252/582; 252/586
(58) Field of Search .................... 252/586, 582; 523/106; 528/195, 198; 428/537.5, 426, 688, 537.1, 457, 332, 411.1

(56) References Cited

U.S. PATENT DOCUMENTS

| | | | |
|---|---|---|---|
| 3,361,706 A | 1/1968 | Smith et al. | 260/39 |
| 4,102,942 A | 7/1978 | Smith et al. | 260/836 |
| 4,720,356 A | 1/1988 | Chu | 252/586 |
| 4,798,745 A | 1/1989 | Martz et al. | 427/407.1 |
| 4,798,746 A | 1/1989 | Claar et al. | 427/407.1 |
| 4,873,029 A | 10/1989 | Blum | 264/1.3 |
| 4,931,220 A | 6/1990 | Haynes et al. | 252/586 |
| 5,239,012 A | 8/1993 | McEntire et al. | 525/327.7 |
| 5,256,452 A | 10/1993 | McMonigal et al. | 427/407.1 |
| 5,391,327 A | 2/1995 | Ligas et al. | 252/586 |
| 5,618,586 A | 4/1997 | Swarup et al. | 427/407.1 |
| 5,645,767 A | 7/1997 | Van Gemert | 252/586 |
| 5,658,501 A | 8/1997 | Kumar et al. | 252/586 |
| 5,770,115 A | 6/1998 | Misura | 252/586 |
| 5,976,422 A | * 11/1999 | Okoroafor et al. | 252/586 |
| 6,068,797 A | * 5/2000 | Hunt | 264/1.7 |
| 6,187,444 B1 | 2/2001 | Bowles, III et al. | 428/423.1 |

FOREIGN PATENT DOCUMENTS

| | | |
|---|---|---|
| WO | WO 9214786 | 9/1992 |
| WO | WO 9837115 | 8/1998 |

OTHER PUBLICATIONS

U.S. patent application Ser. No. 60/067,868, filed Dec. 8, 1997 entitled "Photochromic Epoxy Resin Coating Composition and Articles having such a Coating".

U.S. patent application Ser. No. 09/187,698, filed Nov. 6, 1998 entitled "Photochromic Epoxy Resin Coating Composition and Articles having such a Coating".

* cited by examiner

Primary Examiner—Paul Thibodeau
Assistant Examiner—Holly C. Rickman
(74) Attorney, Agent, or Firm—Frank P. Mallak

(57) ABSTRACT

Described are articles having a polyanhydride photochromic coating. The coatings exhibit a Fischer microhardness of from 50 to 130 Newtons per $mm^2$ and desirable photochromic properties, i.e., the formation of darker activated colors and faster rates of photochromic activation and fade when irradiated with ultraviolet light. Also described are polyanhydride photochromic articles.

26 Claims, No Drawings

POLYANHYDRIDE PHOTOCHROMIC COATING COMPOSITION AND PHOTOCHROMIC ARTICLES

DESCRIPTION OF THE INVENTION

The present invention relates to coatings comprising hydroxyl-functional components(s), polymeric anhydride-functional component(s) and photochromic components(s), hereinafter referred to as photochromic polyanhydride coatings, articles coated with such coatings and photochromic articles, i.e., polymerizates, made of such coating compositions. More particularly, this invention relates to certain photochromic polyanhydride coatings which when coated onto a substrate and exposed to activating light radiation exhibit improved photochromic performance properties. Further, this invention relates to photochromic polyanhydride coatings that meet commercially acceptable "cosmetic" standards for optical coatings applied to optical elements, e.g., lenses.

Photochromic compounds exhibit a reversible change in color when exposed to light radiation involving ultraviolet rays, such as the ultraviolet radiation in sunlight or the light of a mercury lamp. Various classes of photochromic compounds have been synthesized and suggested for use in applications in which a sunlight-induced reversible color change or darkening is desired. The most widely described classes of photochromic compounds are oxazines, pyrans and fulgides.

It has now been discovered that photochromic coated articles having coating thicknesses necessary to demonstrate good photochromic properties, i.e., to color and fade at acceptable rates and to achieve a dark enough colored state, and meet optical coating "cosmetic" standards required by both the industry and the consuming public may be prepared using a photochromic polyanhydride coating. The novel coatings described herein exhibit a Fischer microhardness of from at least 50 to not more than 130 Newtons per $mm^2$. These coatings also exhibit improved photochromic properties, i.e., formation of darker activated color and faster rates of photochromic activation and fade, when irradiated with the ultraviolet light, as compared to such coatings having a Fischer microhardness greater than 130 Newtons per $mm^2$. Also, the composition used to form the coating may be used to form a photochromic polyanhydride polymerizate.

DETAILED DESCRIPTION OF THE INVENTION

In recent years, photochromic articles, particularly photochromic plastic materials for optical applications, have been the subject of considerable attention. In particular, photochromic ophthalmic plastic lenses have been investigated because of the weight advantage they offer, vis-à-vis, glass lenses. Moreover, photochromic transparencies for vehicles, such as cars and airplanes, have been of interest because of the potential safety features that such transparencies offer. Photochromic articles that are most useful are those in which the photochromic compounds exhibit a high activated intensity, a high coloration rate and an acceptable fade rate.

The use of photochromic coatings enables the preparation of photochromic plastic articles without the need to incorporate the photochromic compound(s) into the plastic substrate which avoids the need to develop special optical resin materials for use with photochromic compounds. This is advantageous when the plastic, e.g., thermoplastic polycarbonate, does not have enough internal free volume for a photochromic compound incorporated in the plastic to function properly. The coating composition of the present invention enables preparation of photochromic articles using such plastics. Further, use of photochromic coatings results in more efficient utilization of photochromic compounds by avoiding the losses associated with more conventional transfer methods, e.g., imbibition or permeation, to produce photochromic articles.

Other than in the operating examples, or where otherwise indicated, all values, such as those expressing wavelengths, quantities of ingredients, ranges or reaction conditions, used in this description and the accompanying claims are to be understood as modified in all instances by the term "about".

The photochromic coatings of the present invention may be prepared by the reaction of hydroxyl-functional component(s) having at least two hydroxyl groups and polymeric anhydride-functional component(s) having at least two cyclic carboxylic acid anhydride groups in a composition including at least one organic photochromic component. Other optional ingredients include crosslinking agents, e.g., epoxy-functional components, acrylamide-functional components or melamine resins, and plasticizers in amounts necessary to adjust the Fischer microhardness levels as well as the photochromic performance properties to within the desired range. The coating composition may further include catalyst.

Solvents may also be present in the coating composition. However, as described herein, solvents are not factored into the weight ratios and weight percents stated herein. All weight ratios and weight percents used herein are based on the total solids in the coating composition, unless stated otherwise.

When the coating compositions of the present invention are applied as a coating and cured, they exhibit a Fischer microhardness of at least 50 Newtons per $mm^2$, preferably at least 60, more preferably, at least 70 Newtons per $mm^2$ and not more than 130 Newtons per $mm^2$, preferably, not more than 120 and more preferably not more than 110 Newtons per $mm^2$. The Fischer microhardness may range between any combination of these values, inclusive of the recited values. The photochromic properties of the cured coatings of the present invention are characterized by a $\Delta OD$ after 30 seconds of at least 0.15, preferably, at least 0.17 and most preferably, at least 0.18; and a $\Delta OD$ after 15 minutes of at least 0.50, preferably, at least 0.60, and most preferably, at least 0.63; and a bleach rate of not more than 200 seconds, preferably, not more than 195, and most preferably, not more than 190 seconds—all as measured at 72° F. (22° C.), and as described in Part C of Example 8 herein.

Polyanhydride coatings having microhardness and photochromic performance properties within the aforestated ranges can be produced by balancing the components that contribute to the hardness and softness of the coating matrix. The specific properties of the components comprising the coating or polymerizate that will effect the microhardness and photochromic performance properties of the polyanhydride matrix are the glass transition temperature, molecular weight and crosslink density. Generally, using components having higher glass transition temperatures and molecular weights results in coatings and polymerizates having increased microhardness and vice versa. An increase in the number of reactive groups of the component will also cause an increase in the microhardness, provided that all of the groups are reacted. In this latter case, an increase in the number of reactive groups, i.e., crosslinking sites, increases the crosslinked density of the cured coating. It is believed however that the harder the coating or polymerizate, the slower the performance of the photochromic compound contained therein.

The contribution of a particular component, e.g., the hydroxyl-functional component, to either the hardness or softness of the polyanhydride coating can be readily determined-by measuring the Fischer microhardness of the resulting polyanhydride coating. The hardness-producing component, as defined herein, is a component that increases the microhardness of the polyanhydride coating as its concentration increases. Similarly, the softness-producing component, as defined herein, is a component that decreases the microhardness of the polyanhydride coating as its concentration increases. Examples of hardness-producing hydroxyl-functional components, e.g., organic polyols, include, but are not limited to, low molecular weight polyols, amide-containing polyols, epoxy polyols and urethane polyols. Softness-producing hydroxyl-functional components, e.g., organic polyols, include, but are not limited to, polyester polyols, polyacrylic polyols, and polyether polyols, e.g. polyoxyalkylenes and poly(oxytetramethylene)diols. All of the aforementioned polyols are defined in more detail hereinafter.

Typically, the hydroxy-functional component of the present invention is a film forming polymer, but a hydroxyl component which is not polymeric may be utilized. However, it is necessary that at least the combination of the anhydride-functional component with the hydroxy-functional component results in a crosslinked polymeric coating.

Examples of hydroxyl-functional components that may be used to prepare the composition of the present invention include, but are not limited to, (a) low molecular weight polyols, i.e., polyols having a weight average molecular weight less than 500, e.g., aliphatic diols, such as $C_2$–$C_{10}$ aliphatic diolsi triols and polyhydric alcohols; (b) polyester polyols; (c) polyether polyols; (d) amide-containing polyols; (e) polyacrylic polyols; (f) polyhydric polyvinyl alcohols; (g) epoxy polyols; (h) urethane polyols; and (i) mixtures of such polyols. Preferably, the organic polyols are selected from the group consisting of low molecular weight polyols, polyacrylic polyols, polyether polyols, polyester polyols, urethane polyols and mixtures thereof. More preferably, the organic polyols are selected from the group consisting of polyacrylic polyols, polyester polyols, polyether polyols, urethane polyols and mixtures thereof, and most preferably, polyacrylic polyols, polyether polyols and mixtures thereof.

Examples of low molecular weight polyols that can be used in the coating composition of the present invention include: tetramethylolmethane, i.e., pentaerythritol; trimethylolethane; trimethylolpropane; di-(trimethylolpropane); dimethylolpropionic acid; 1,2-ethanediol, i.e., ethylene glycol; 1,2-propanediol, i.e., propylene glycol; 1,3-propanediol; 2,2-dimethyl-1,3-propanediol, i.e., neopentyl glycol; 1,2,3-propanetriol, i.e., glycerin; 1,2-butanediol; 1,4-butanediol; 1,3-butanediol; 1,2,4-butanetriol; 1,2,3,4-butanetetrol; 2,2,4-trimethyl-1,3-pentanediol; 1,5-pentanediol; 2,4-pentanediol; 1,6-hexanediol; 2,5-hexanediol; 1,2,6 hexanetriol; 2-methyl-1,3-pentanediol; 2,4-heptanediol; 2-ethyl-1,3-hexanediol; 1,4-cyclohexanediol; 1-(2,2-dimethyl-3-hydroxypropyl)-2,2-dimethyl-3-hydroxypropionate; hexahydric alcohol, i.e., sorbitol; diethylene glycol; dipropylene glycol; 1,4-cyclohexanedimethanol; 1,2-bis(hydroxymethyl)cyclohexane; 1,2-bis(hydroxyethyl)-cyclohexane; bishydroxypropyl hydantoins; TMP/epsilon-caprolactone triols; hydrogenated bisphenol A; tris hydroxyethyl isocyanurate; the alkoxylation product of 1 mole of 2,2-bis(4-hydroxyphenyl)propane (i.e., bisphenol-A) and 2 moles of propylene oxide; ethoxylated or propoxylated trimethylolpropane or pentaerythritol having a number average molecular weight less than 500, polyethylene glycol, polypropylene glycol and polybutylene glycol having a number average molecular weight less than 500 and mixtures of such low molecular weight polyols.

Polyester polyols are known and can have a number average molecular weight in the range of from 500 to 10,000. They are prepared by conventional techniques utilizing low molecular weight diols, triols and polyhydric alcohols known in the art, including but not limited to the previously described low molecular weight polyols (optionally in combination with monohydric alcohols) with polycarboxylic acids.

Examples of suitable polycarboxylic acids for use in preparing the polyester include: phthalic acid, isophthalic acid, terephthalic acid, tetrahydrophthalic acid, tetrachlorophthalic acid, hexahydrophthalic acid, methylhexahydrophthalic acid, adipic acid, azelaic acid, sebacic acid, maleic acid, succinic acid, glutaric acid, fumaric acid, chlorendic acid, trimellitic acid, tricarballylic acid and mixtures thereof. Anhydrides of the above acids, where they exist, can also be employed. In addition, certain materials which react in a manner similar to acids to form polyester polyols are also useful. Such materials include lactones, e.g., caprolactones, propiolactone and butyrolactone, and hydroxy acids such as hydroxycaproic acid and dimethylol propionic acid. If a triol or polyhydric alcohol is used, a monocarboxylic acid, such as acetic acid and/or benzoic acid, may be used in the preparation of the polyester polyols, and for some purposes, such a polyester polyol may be desirable. Moreover, polyester polyols are understood herein to include polyester polyols modified with fatty acids or glyceride oils of fatty acids (i.e., conventional alkyl polyols containing such modification). Another polyester polyol which may be utilized is one prepared by reacting an alkylene oxide, e.g., ethylene oxide, propylene oxide, etc., and the glycidyl esters of versatic acid with methacrylic acid to form the corresponding ester.

Polyether polyols are known and may have a number average molecular weight in the range of from 500 to 10,000. Examples of polyether polyols include various polyoxyalkylene polyols, polyalkoxylated polyols having a number average molecular weight greater than 500, e.g., poly(oxytetramethylene)diols and mixtures thereof. The polyoxyalkylene polyols can be prepared, according to well-known methods, by condensing alkylene oxide, or a mixture of alkylene oxides using acid or base catalyzed addition, with a polyhydric initiator or a mixture of polyhydric initiators such as ethylene glycol, propylene glycol, glycerol, sorbitol and the like. Illustrative alkylene oxides include ethylene oxide, propylene oxide, butylene oxide, e.g., 1,2-butylene oxide, amylene oxide, aralkylene oxides, e.g., styrene oxide, and the halogenated alkylene oxides such as trichlorobutylene oxide and so forth. The more preferred alkylene oxides include butylene oxide, propylene oxide and ethylene oxide or a mixture thereof using random or stepwise oxyalkylation. Examples of such polyoxyalkylene polyols include polyoxyethylene, i.e., polyethylene glycol, polyoxypropylene, i.e., polypropylene glycol and polyoxybutylene, i.e., polybutylene glycol. The number average molecular weight of such polyoxyalkylene polyols used as the soft segment is equal to or greater than 600, more preferably, equal to or greater than 725, and most preferably, equal to or greater than 1000.

The polyether polyols also include the known poly(oxytetramethylene)diols prepared by the polymerization of tetrahydrofuran in the presence of Lewis acid catalysts such as boron trifluoride, tin (IV) chloride and sulfonyl chloride. The number average molecular weight of poly(oxytetramethylene)diols used as the soft segment ranges from 500 to 5000, preferably from 650 to 2900, more preferably from 1000 to 2000, and most preferably is 1000.

Polyalkoxylated polyols having a number average molecular weight greater than 500 may be represented by the following general formula I,

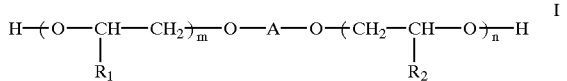

wherein m and n are each a positive number, the sum of m and n being from 5 to 70, $R_1$, and $R_2$ are each hydrogen, methyl or ethyl, preferably hydrogen or methyl and A is a divalent linking group selected from the group consisting of straight or branched chain alkylene (usually containing from 1 to 8 carbon atoms), phenylene, $C_1$–$C_9$ alkyl substituted phenylene and a group represented by the following general formula II,

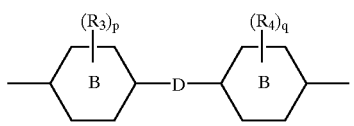

wherein $R_3$ and $R_4$ are each $C_1$–$C_4$ alkyl, chlorine or bromine, p and q are each an integer from 0 to 4,

represents a divalent benzene group or a divalent cyclohexane group, and D is O, St —S($O_2$)—, —C(o)—, —$CH_2$—, —CH═CH—, —C($CH_3$)$_2$—, —C($CH_3$)($C_6H_5$)— or

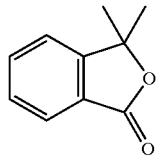

when

is the divalent benzene group, and D is OS, —$CH_2$—, or —C($CH_3$)$_2$— when

is the divalent cyclohexane group.

Preferably, the polyalkoxylated polyol is one wherein the sum of m and n in the general formula I is from 15 to 40, e.g., 25 to 35, $R_1$ and $R_2$ are each hydrogen, and A is a divalent linking group according to general formula II wherein

represents a divalent benzene group, p and q are each O, and D is —C($CH_3$)$_2$—, and most preferably, the sum of m and n is from 25 to 35, e.g., 30. Such materials may be prepared by methods which are well known in the art. One such commonly used method involves reacting a polyol, e.g., 4,4'-isopropylidenediphenol, with an oxirane containing substance, for example ethylene oxide, propylene oxide, a-butylene oxide or β-butylene oxide, to form what is commonly referred to as an ethoxylated, propoxylated or butoxylated polyol having hydroxy functionality.

Examples of polyols suitable for use in preparing the polyalkoxylated polyols include the low molecular weight polyols described herein; phenylene diols such as ortho, meta and para dihydroxy benzene; alkyl substituted phenylene diols such as 2,6-dihydroxytoluene, 3-methylcatechol, 4-methylcatechol, 2-hydroxybenzyl alcohol, 3-hydroxybenzyl alcohol, and 4-hydroxybenzyl alcohol; dihydroxybiphenyls such as 4,4'-dihydroxybiphenyl and 2,2'-dihydroxybiphenyl; bisphenols such as 4,4'-isopropylidenediphenol; 4,4'-oxybisphenol; 4,4'-dihydroxybenzenephenone; 4,4'-thiobisphenol; phenolphthalein; bis(4-hydroxyphenyl)methane; 4,4'-(1,2-ethenediyl)bisphenol; and 4,4'-sulfonylbisphenol; halogenated bisphenols such as 4,4'-isopropylidenebis(2,6-dibromophenol), 4,4'-isopropylidenebis(2,6-dichlorophenol) and 4,4'-isopropylidenebis(2,3,5,6-tetrachlorophenol); and biscyclohexanols, which can be prepared by hydrogenating the corresponding bisphenols, such as 4,4'-isopropylidene-biscyclohexanol; 4,4'-oxybiscyclohexanol; 4,4'-thiobiscyclohexanol; and bis(4-hydroxycyclohexanol)methane.

Preferably, the polyether polyols are selected from the group consisting of polyoxyalkylene polyols, polyalkoxylated polyols, poly(oxytetramethylene)diols and mixtures thereof, and most preferably, polyoxyalkylene polyols having a number average molecular weight of equal to or greater than 1,000, ethoxylated Bisphenol A having approximately 30 ethoxy groups, poly(oxytetramethylene) diols having a number average molecular weight of 1000 and mixtures thereof.

Amide-containing polyols are known and typically are prepared from the reaction of diacids or lactones and the low molecular weight polyols described herein with diamines or aminoalcohols as described hereinafter. For example, amide-containing polyols may be prepared by the reaction of neopentyl glycol, adipic acid and hexamethylenediamine. The amide-containing polyols may also be prepared through aminolysis by the reaction, for example, of carboxylates, carboxylic acids, or lactones with amino alcohols. Examples of suitable diamines and amino alcohols include hexamethylenediamines, ethylenediamines, phenylenediamine, monoethanolamine, diethanolamine, isophorone diamine and the like.

Polyhydric polyvinyl alcohols are known and can be repared, for example, by the polymerization of vinyl acetate in the presence of suitable initiators followed by hydrolysis of at least a portion of the acetate moieties. In the hydrolysis process, hydroxyl groups are formed which are attached directly to the polymer backbone. In addition to homopolymers, copolymers of vinyl acetate and monomers such as vinyl chloride can be prepared and hydrolyzed in similar fashion to form polyhydric polyvinyl alcohol-polyvinyl chloride copolymers.

Epoxy polyols are known and can be prepared, for example, by the reaction of glycidyl ethers of polyphenols such as the diglycidyl ether of 2,2-bis(4-hydroxyphenyl) propane, with polyphenols such as 2,2-bis(4-hydroxyphenyl)propane. Epoxy polyols of varying molecular weights and average hydroxyl functionality can be prepared depending upon the ratio of starting materials used.

Urethane polyols are known and can be prepared, for example, by reaction of a polyisocyanate with excess organic polyol to form a hydroxyl functional product. Examples of polyisocyanates useful in the preparation of urethane polyols include toluene-2,4-diisocyanate; toluene-2,6-diisocyanate; diphenylmethane-4,4,-diisocyanate; diphenyl methane-2,4'-diisocyanate; para-phenylene diisocyanate; biphenyl diisocyanate; 3,3'-dimethyl-4,4'-diphenylene diisocyanate; tetramethylene-1,4-diisocyanate; hexamethylene-1,6-diisocyanate; 2,2,4-trimethyl hexane-1,6-diisocyanate; lysine methyl ester diisocyanate; bis(isocyanato ethyl)fumarate; isophorone diisocyanate; ethylene diisocyanate; dodecane-1,12-diisocyanate; cyclobutane-1,3-diisocyanate; cyclohexane-1,3-diisocyanate; cyclohexane-1,4-diisocyanate; methyl cyclohexyl diisocyanate; dicyclohexylmethane diisocyanate; hexahydrotoluene-2,4-diisocyanate; hexahydrotoluene- 2,6-diisocyanate; hexahydrophenylene-1,3-diisocyanate; hexahydrophenylene-1,4-diisocyanate; polymethylene polyphenol isocyanates perhydrodiphenylmethane-2,4'-diisocyanate; perhydrodiphenylmethane-4,4,-diisocyanate and mixtures thereof.

Examples of organic polyols useful in the preparation of urethane polyols include the other polyols described herein, e.g., low molecular weight polyols, polyester polyols, polyether polyols, amide-containing polyols, polyacrylic polyols, polyhydric polyvinyl alcohols and mixtures thereof.

Polyacrylic polyols are known and can be prepared by free-radical addition polymerization techniques of monomers described hereinafter. Preferably said polyacrylic polyols have a weight average molecular weight of from 500 to 50,000 and a hydroxyl number of from 20 to 270. More preferably, the weight average molecular weight is from 1000 to 30,000 and the hydroxyl number is from 80 to 250. Most preferably, the average molecular weight is from 3,000 to 20,000 and the hydroxyl number is from 100 to 225.

Polyacrylic polyols include, but are not limited to, the known hydroxyl-functional addition polymers and copolymers of acrylic and methacrylic acids; their ester derivatives including, but not limited to, their hydroxyl-functional ester derivatives. Examples of hydroxyl-functional ethylenically unsaturated monomers to be used in the preparation of the hydroxyl-functional addition polymers include hydroxyethyl (meth)acrylate, i.e., hydroxyethyl acrylate and hydroxyethyl methacrylate, hydroxypropyl (meth)acrylate, hydroxybutyl (meth)acrylate, hydroxymethylethyl acrylate, hydroxymethylpropyl acrylate and mixtures thereof.

More preferably, the polyacrylic polyol is a copolymer of hydroxy-functional ethylenically unsaturated (meth)acrylic monomers and other ethylenically unsaturated onomers selected from the group consisting of vinyl aromatic onomers, e.g., styrene, α-methyl styrene, t-butyl styrene and vinyl toluene; vinyl aliphatic monomers such as ethylene, propylene and 1,3-butadiene; (meth)acrylamide; (meth)acrylonitrile; vinyl and vinylidene halides, e.g., vinyl chloride and vinylidene chloride; vinyl esters, e.g., vinyl acetate; alkyl esters of acrylic and methacrylic acids, i.e. alkyl esters of (meth)acrylic acids, having from 1 to 17 carbon atoms in the alkyl group, including methyl (meth)acrylate, ethyl (meth)acrylate, butyl (meth)acrylate, cyclohexyl (meth) acrylate, 2-ethylhexyl (meth)acrylate, isobornyl (meth) acrylate and lauryl (meth)acrylate; epoxy-functional ethylenically unsaturated monomers such as glycidyl (meth) acrylate; carboxy-functional ethylenically unsaturated monomers such as acrylic and methacrylic acids and mixtures of such ethylenically unsaturated monomers.

The hydroxyl-functional ethylenically unsaturated (meth) acrylic monomer(s) may comprise up to 95 weight percent of the polyacrylic polyol copolymer. Preferably it comprises up to 70 weight percent, and more preferably, the hydroxyl-functional ethylenically unsaturated (meth)acrylic monomer(s) comprises up to 45 weight percent of the total copolymer.

The polyacrylic polyols described herein can be prepared by free radical initiated addition polymerization of the monomer(s), and by organic solution polymerization techniques. The monomers are typically dissolved in an organic solvent or mixture of solvents including ketones such as methyl ethyl ketones, esters such as butyl acetate, the acetate of propylene glycol, and hexyl acetate, alcohols such as ethanol and butanol, ethers such as propylene glycol monopropyl ether and ethyl-3-ethoxypropionate, and aromatic solvents such as xylene and SOLVESSO 100, a mixture of high boiling hydrocarbon solvents available from Exxon Chemical Co. The solvent is first heated to reflux, usually 70 to 160° C., and the monomer or a mixture of monomers and free radical initiator is slowly added to the refluxing solvent, over a period of about 1 to 7 hours. Adding the monomers too quickly may cause poor conversion or a high and rapid exothermic reaction, which is a safety hazard. Suitable free radical initiators include t-amyl peroxyacetate, di-t-amyl peroxyacetate and 2,2'-azobis (2-methylbutanenitrile). The free radical initiator is typically present in the reaction mixture at from 1 to 10 percent, based on total weight of the monomers. The polymer prepared by the procedures described herein is non-gelled or ungelled and preferably has a weight average molecular weight of from 500 to 50,000 grams per mole.

The molecular weight of suitable hydroxyl-functional components for the preparation of compositions of the invention can vary within wide limits depending on the nature of the specific classes of polyols selected. Typically, the number average molecular weight of suitable polyols can range from 62 to'50,000, preferably from 500 to 20,000, and the hydroxyl equivalent weight can range from 31 to 25,000, e.g., from 100 to 2,000, or from 250 to 1000. The molecular weights of the hydroxyl group-containing polymers are determined by gel permeation chromatography using a polystyrene standard.

The anhydride-functional component(s) of the composition is a polymeric material containing at least two cyclic carboxylic acid anhydride groups in the polymer molecule. Polymers having number average molecular weights of between 1000 and 50,000, preferably between 2000 and 5000, are useful; the molecular weight being determined by gel permeation chromatography using a polystyrene standard. The anhydride-functional component can be prepared by the aforedescribed methods used for the polyacrylic polyols, e.g., free radical initiated addition polymerization of the monomer(s) and organic solution polymerization techniques.

Particularly preferred in the practice of the invention is the use of free radical addition polymers prepared by polymerizing a polymerizable, ethylenically unsaturated monomer having anhydride functionality such as maleic anhydride, citraconic anhydride, itaconic anhydride, propenyl succinic anhydride, etc., with other ethylenically unsaturated monomers substantially free of anhydride functionality. Preferably, the ethylenically unsaturated carboxylic acid anhydride monomer is present in the mixtures of monomers at a level of at least 11 weight percent, based on the total weight of the monomer mixture. Examples of such ethylenically unsaturated materials include esters of (meth) acrylic acids, i.e., acrylic and methacrylic acids, such as methyl acrylate, methyl methacrylate, butyl acrylate and butyl methacrylate; vinyl compounds such as vinyl acetate and vinyl chloride; styrene-based materials such as styrene itself and alpha-methylstyrene; allyl compounds such as allyl chloride and allyl acetate and other co-polymerizable ethylenically unsaturated monomers such as acrylonitrile and methacrylonitrile, amides such as acrylamide and methacrylamide, dienes such as 1,3-butadiene and mixtures of such ethylenically unsaturated materials.

Typically, the amounts of the hydroxyl-functional component(s) and the anhydride-functional component(s) in the coating compositions of the invention are selected to provide a ratio of equivalents of hydroxyl groups to equivalents of anhydride groups in the range of 3:1 to 1:3, e.g., from 2:1 to 1:2, and preferably 1:1. The hydroxyl-functional component and the anhydride-functional component in combination may be present in the coating composition in amounts of from 1.0 to 99.9, preferably from 20 to 95 percent, and more preferably from 50 to 90 percent by weight based on the weight of total resin solids.

The coating composition of the invention may additionally comprise a catalytic amount of a catalyst for accelerating the curing reaction between hydroxyl groups of the hydroxyl-functional component and anhydride groups of the anhydride-functional component. Most often, the catalyst comprises an amino group, preferably a tertiary amino group. The amino group may be present in the molecule of the hydroxyl component or in a separate amine compound such as, for example, dimethyl cocoamine, dimethyl dodecylamine, triethylamine, triethanolamine and phenolic compounds containing at least two dialkyl-amino groups. Preferably, the amino group is in a separate amine compound. The amount of optional catalyst used is a catalytic amount, i.e., an amount necessary to catalyze the polymerization of monomers. Typically the amount of catalyst ranges from 0.01 to 10 weight percent, and preferably is from 0.1 to 3 weight percent.

When the amino group containing catalytic agent is incorporated in the hydroxyl component, one or more amino groups may be pendant groups in a hydroxyl-containing copolymer. For example, an acrylic polyol may be prepared utilizing a dialkyl-amino-alkyl acrylate or methacrylate such as dimethylaminoethyl acrylate, diethylaminoethyl acrylate, dimethylaminoethyl methacrylate and diethylaminoethyl methacrylate, or a dialkyl-amino-alkyl-substituted amide such as dimethylaminopropyl methacrylamide. Although less preferred, a secondary amine such as t-butylaminoethylmethacrylate may also be used. Alternatively, tertiary amine groups can be introduced into an acrylic polyol by copolymerizing glycidyl acrylate or methacrylate with other appropriate unsaturated comonomers and subsequently reacting the glycidyl groups with a secondary amine.

After adding an effective amount of catalyst, any manner of curing the polymerizable composition of the present invention that is appropriate for the specific composition and substrate may be used. Such methods include ultraviolet, visible, thermal, ultrasound, infrared, microwave, gamma, electron and other forms of radiation.

Solvents that may be present in the coating composition are those that are necessary to dissolve the solid components. The minimum amount of solvent present in the coating composition is a solvating amount, i.e., an amount which is sufficient to solubilize the solid components in the coating composition. For example, the amount of solvent present may range from 10 to 80 weight percent based on the total weight of the coating composition.

Suitable solvents include but are not limited to the following: benzene, toluene, methyl ethyl ketone, methyl isobutyl ketone, acetone, ethanol, tetrahydrofurfuryl alcohol, propyl alcohol, propylene carbonate, N-methyl pyrrolidinone, N-vinyl pyrrolidinone, N-acetyl pyrrolidinone, N-hydroxymethyl pyrrolidinone, N-butyl pyrrolidinone, N-ethyl pyrrolidinone, N-(N-octyl) pyrrolidinone, N-(N-dodecyl) pyrrolidinone, 2-methoxyethyl ether, xylene, cyclohexane, 3-methyl cyclohexanone, ethyl acetate, butyl acetate, tetrahydrofuran, methanol, amyl propionate, methyl propionate, propylene glycol methyl ether, diethylene glycol monobutyl ether, dimethyl sulfoxide, dimethyl foramide, ethylene glycol, mono- and dialkyl ethers of ethylene glycol and their derivatives sold as CELLOSOLVE industrial solvents by Union Carbide and mixtures thereof.

Among the optional ingredients which can be used in the coating composition are crosslinking agents such as polyepoxides. Suitable polyepoxides include epoxy-containing acrylic polymers, epoxy condensation polymers such as polyglycidyl ethers of alcohols and phenols, polyglycidyl esters of polycarboxylic acids, certain polyepoxide monomers and oligomers and mixtures of such polyepoxides. Examples of these materials are described in U.S. Pat. No. 5,256,452 column 3, line 28 to column 4, line 46. The preferred polyepoxide is the epoxy-containing acrylic polymer.

Specific examples of epoxy condensation polymers include polyglycidyl esters resulting from the reaction of polycarboxylic acids with an epihalohydrin such as epichlorohydrin. The polycarboxylic acid may be formed by any method known in the art and in particular, by the reaction of aliphatic alcohols, diols or polyols with an anhydride. For example, trimethylol propane or pentaerythritol can be reacted with hexahydrophthalic anhydride to produce a polycarboxylic acid which is then reacted with epichlorohydrin to produce a polyglycidyl ester.

Further examples of such polyepoxides are polyglycidyl ethers of polyhydric phenols and of aliphatic alcohols. The polyepoxides may be produced by the etherification of the polyhydric phenol or aliphatic alcohol with an epihalohydrin such as epichlorohydrin in the presence of alkali. Examples of suitable polyphenols are 2,2-bis(4-hydroxyphenyl) propane (bisphenol A) and 1,1-bis(4-hydroxyphenyl)ethane. Examples of suitable aliphatic alcohols include ethylene glycol, diethylene glycol, pentaerythritol, trimethylol propane, 1,2-propylene glycol and 1,4-butylene glycol. Also, cycloaliphatic polyols such as 1,2-cyclohexanediol, 1,4-cyclohexanediol, 1,4-cyclohexane dimethanol, 1,2-bis(hydroxymethyl)cyclohexane and hydrogenated bisphenol A may be used.

In addition to the aforedescribed epoxy-containing polymers, certain low molecular weight polyepoxide monomers and oligomers may also be used. Examples of these materials are described in U.S. Pat. No. 4,102,942 in column 3, lines 1–16, which disclosure is incorporated by reference.

Specific examples of such low molecular weight polyepoxides are 3,4-epoxycyclohexylmethyl-3,4-epoxycyclohexanecarboxylate and bis(3,4-epoxycyclohexylmethyl)adipate. These materials are aliphatic polyepoxides as are the epoxy-containing acrylic polymers. Other materials that may be used in place of or in combination with the previously mentioned polyepoxides include the reaction products of glycidol with isocyanates such as m-isopropenyl-α,α-dimethylbenzyl isocyanate, di-functional isocyanates, tri-functional isocyanates, and mixtures of these reaction products.

The preferred epoxy-containing acrylic polymer is a copolymer of an ethylenically unsaturated monomer having acrylic functionality and at least one epoxy group, and at least one polymerizable ethylenically unsaturated monomer which is free of epoxy groups. Ethylenically unsaturated monomers containing epoxy groups suitable for use are those containing 1,2-epoxy groups and include glycidyl acrylate, glycidyl methacrylate, 3,4-epoxycyclohexylmethyl (meth)acrylate; 2-(3,4-epoxycyclohexyl)ethyl (meth) acrylate and allyl glycidyl ether.

Ethylenically unsaturated monomers which do not contain epoxy groups can be any such monomers known to those skilled in the art that can react by free radical addition polymerization with epoxy-containing unsaturated monomers to form a copolymer with epoxy functionality. Non-exclusive examples of such ethylenically unsaturated monomers which do not contain epoxy groups are alkyl esters of acrylic and methacrylic acid containing from 1 to 20 atoms in the alkyl group, e.g., ethyl acrylate, butyl acrylate, 2-ethylhexyl acrylate, ethyl methacrylate, butyl methacrylate, etc.; vinyl monomers such as styrene, vinyl toluene and the like.

Other crosslinking agents that may be used include blocked or unblocked polyisocyanates, the melamine formaldehyde resins such as the CYMEL® series of resins available from Cytec Industries, Inc. and acrylamide-functional polymers, e.g., N-butoxymethyl(meth)acrylamide, disclosed in U.S. Pat. No. 5,618,586, which disclosure is incorporated herein by reference. Other optional ingredients which may be present are plasticizers such as benzoate esters, e.g., BENZOFLEX® P-200 plasticizer. Both the crosslinking agent and plasticizer would be used in amounts effective to result in a harder cured coating or a softer cured coating, respectively.

The photochromic polyanhydride coating composition of the present invention may further comprise additional conventional ingredients which impart desired characteristics to the composition, or which are required for the process used to apply and cure the composition to the substrate or which enhance the cured coating made therefrom. Such additional ingredients comprise rheology control agents, leveling agents, e.g., surfactants, initiators, cure-inhibiting agents, free radical scavengers and adhesion promoting agents, such as trialkoxysilanes preferably having an alkoxy radical of 1 to 4 carbon atoms, including γ-glycidoxypropyltrimethoxysilane, γ-aminopropyltrimethoxysilane, 3,4-epoxycyclohexylethyltrimethoxysilane and aminoethyltrimethoxysilane.

Photochromic components that may be utilized in the polyanhydride coating composition(s) of the present invention are organic photochromic compounds that may be used individually or in combination with other complementary photochromic compounds, i.e., organic photochromic compounds having at least one activated absorption maxima within the range of between about 400 and 700 nanometers, or substances containing same, that may be incorporated, e.g., dissolved or dispersed, in the polyanhydride composition(s) used to prepare the coatings and which compounds or mixtures of compounds color when activated to an appropriate hue.

More particularly, the organic photochromic compounds comprise:

(a) at least one photochromic organic compound having a visible lambda max of from 400 nanometers to 525 nanometers; and (b) at least one photochromic organic compound having a visible lambda max of from greater than 525 nanometers to 700 nanometers.

Examples of suitable photochromic compounds for use in the polyanhydride coating composition of the present invention include benzopyrans, naphthopyrans, e.g., naphtho[1,2-b]pyrans and naphtho[2,1-b]pyrans, phenanthropyrans, quinopyrans, benzoxazines, naphthoxazines, spiro(indoline) pyridobenzoxazines and indeno-fused naphthopyrans disclosed in U.S. Pat. No. 5,645,767. Specific examples include the novel naphthopyrans of-U.S. Pat. No. 5,658,501 and the complementary organic photochromic substances disclosed in this patent from column 11, line 57 through column 13, line 36. Other photochromic substances contemplated for use herein are the photochromic metal-dithizonates, e.g., mercury dithizonates which are described in, for example, U.S. Pat. No. 3,361,706; and fulgides and fulgimides, e.g. the 3-furyl and 3-thienyl fulgides and fulgimides, which are described in U.S. Pat. No. 4,931,220 at column 20, line 5 through column 21, line 38 and mixtures of the aforementioned suitable photochromic substances.

The disclosures relating to such photochromic compounds in the aforedescribed patents are incorporated herein, in toto, by reference. The photochromic coatings of the present invention may contain one photochromic compound or a mixture of photochromic compounds, as desired. Mixtures of photochromic compounds may be used to attain certain activated colors such as a near neutral gray or brown. Further discussion of neutral colors and ways to describe such colors is found in U.S. Pat. No. 5,645,767 column 12, line 66 to column 13, line 19.

The amount of the photochromic substances described herein to be used in the coating or polymerizate of the present invention is an amount sufficient to produce a photochromic effect discernible to the naked eye upon activation; Generally such amount can be described as a photochromic amount.

The relative amounts of the aforesaid photochromic compounds used will vary and depend in part upon the relative intensities of the color of the activated species of such compounds, and the ultimate color desired. Generally, the amount of photochromic substance incorporated into the coating composition may range from 0.1 to 40 weight percent based on the weight of the solids in the coating composition. Preferably, the concentration of photochromic substances ranges from 1.0 to 30 weight percent, more preferably, from 3 to 20 weight percent, and most preferably, from 5 to 15 weight percent, e.g., from 7 to 14 weight percent.

The photochromic compound(s) described herein may be incorporated into the coating composition by dissolving or dispersing the photochromic substance within the organic polyol; by adding it to a mixture of the polyanhydride-forming coating composition; and/or by dissolving it in solvent before adding it to the organic polyol or coating composition. Alternatively, the photochromic compounds may be incorporated into the cured coating or polymerizate by imbibition, permeation or other transfer methods as known by those skilled in the art.

Compatible (chemically and color-wise) tints, i.e., dyes, may be added to the coating composition, applied to coated article or applied to the substrate prior to coating to achieve-a more aesthetic result, for medical reasons, or for reasons of fashion. The particular dye selected will vary and depend on the aforesaid need and result to be achieved. In one embodiment, the dye may be selected to complement the color resulting from the activated photochromic substances, e.g., to achieve a more neutral color or absorb a particular wavelength of incident light. In another embodiment, the dye may be selected to provide a desired hue to the substrate and/or coated article when the photochromic substances is in an unactivated state.

Adjuvant materials may also be incorporated into the coating composition with the photochromic substances, prior to, simultaneously with or subsequent to application or incorporation of the photochromic substances in the coating composition or cured coating. For example, ultraviolet light absorbers may be admixed with photochromic substances before their addition to the coating composition or such absorbers may be superposed, e.g., superimposed, as a layer between the photochromic coating and the incident light. Further, stabilizers may be admixed with the photochromic substances prior to their addition to the coating composition to improve the light fatigue resistance of the photochromic substances. Stabilizers, such as hindered amine light stabilizers (HALS), antioxidants, e.g., polyphenolic antioxidants, asymmetric diaryloxalamide (oxanilide) compounds and singlet oxygen quenchers, e.g., a nickel ion complex with an organic ligand, or mixtures of stabilizers are contemplated. They may be used alone or in combination. Such stabilizers are described in U.S. Pat. Nos. 4,720,356, 5,391,327 and 5,770,115 which patents are incorporated herein by reference.

The coating compositions of the present invention may be applied to substrates, of any type such as, for example paper, glass, ceramics, wood, masonry, textiles, metals and polymeric organic materials. Preferably, the substrate is an polymeric organic material, particularly, thermoset and thermoplastic polymeric organic materials, e.g., thermoplastic polycarbonate type polymers and copolymers and homopolymers or copolymers of a polyol(allyl carbonate) used as organic optical materials.

The amount of the coating composition applied to at least one surface of the substrate is an amount necessary to incorporate a sufficient quantity of the organic photochromic compound(s) to produce a coating that exhibits the required change in optical density ($\Delta OD$) when the cured coating is exposed to UV radiation. The required change in optical density is that which, when tested at 72° F. (22° C.) produces a $\Delta OD$ of at least 0.15 after 30 seconds and at least 0.50 after 15 minutes. The bleach rate of the photochromic coating (the photochromic(s) in the coating) should be not more than 200 seconds using the photochromic response testing described in Part C of Example 8 herein. The applied coating may have a thickness of at least 5 microns, preferably, at least 10 microns, more preferably, at least 20 microns, e.g., 25 microns, and a thickness of not more than 200 microns, preferably not more than 100 microns, and more preferably not more than 50 microns, e.g., 40 microns. The thickness of the coating may range between any combination of these values, inclusive of the recited values.

It is typical to treat the surface of the substrate to be coated prior to applying the coating composition of the present invention for the purposes of cleaning the surface and promoting adhesion. Effective treatment techniques for plastics, such as those prepared from CR-39® diethylene glycol bis(allyl carbonate) monomer or thermoplastic polycarbonate, e.g., a resin derived from bisphenol A and phosgene, include ultrasonic cleaning; washing with an aqueous mixture of organic solvent, e.g., a 50:50 mixture of isopropanol: water or ethanol: water; UV treatment; activated gas treatment, e.g., treatment with low temperature plasma or corona discharge, and chemical treatment such as hydroxylation, i.e., etching of the surface with an aqueous solution of alkali, e.g., sodium hydroxide or potassium hydroxide, that may also contain a fluorosurfactant. See U.S. Pat. No. 3,971,872, column 3, lines 13 to 25; U.S. Pat. No. 4,904,525, column 6, lines 10 to 48; and U.S. Pat. No. 5,104,692, column 13, lines 10 to 59, which describe surface treatments of polymeric organic materials.

The treatment used for cleaning glass surfaces will depend on the type of dirt present on the glass surface. Such treatments are known to those skilled in the art. For example, washing the glass with an aqueous solution that may contain a low foaming, easily rinsed detergent, followed by rinsing and drying with a lint-free cloth; and ultrasonic bath treatment in heated (about 50° C.) wash water, followed by rinsing and drying. Pre-cleaning with an alcohol-based cleaner or organic solvent prior to washing may be required to remove adhesives from labels or tapes.

In some cases, it may be necessary to apply a primer to the surface of the substrate before application of the coating composition of the present invention. The primer serves as a barrier coating to prevent interaction of the coating ingredients with the substrate and vice versa, and/or as an adhesive layer to adhere the coating composition to the substrate. Application of the primer may be by any of the methods used in coating technology such as, for example, spray coating, spin coating, spread coating, curtain coating, dip coating, casting or roll-coating.

The use of protective coatings, some of which may contain polymer-forming organosilanes, as primers to improve adhesion of subsequently applied coatings has been described. In particular, the use of non-tintable coatings is preferred. Examples of commercial coating products include SILVUE 124 and HI-GARD coatings, available from SDC Coatings, Inc. and PPG Industries, Inc., respectively. In addition, depending on the intended use of the coated article, it may be necessary to apply an appropriate protective coating(s), i.e., an abrasion resistant coating onto the exposed surface of the coating composition to prevent scratches from the effects of friction *and abrasion. In some cases, the primer and protective coatings are interchangeable, i.e., the same coating may be used as the primer and the protective coating(s). Other coatings or surface treatments, e.g., a tintable coating, antireflective surface, etc., may also be applied to the cured coating of the present invention.

The coating composition of the present invention may be applied using the same methods described herein for applying the primer and the protective coating(s) or other methods known in the art can be used. The coating composition may be applied by spin coating, curtain coating, dip coating, spray coating or by methods used in preparing overlays. Such methods for producing overlays are disclosed in U.S. Pat. No. 4,873,027, which patent is incorporated herein by reference.

Following application of the coating composition to the treated surface of the substrate, the coating is cured. Depending on the substrate and components selected for the coating composition of the present invention, the coating may be cured at temperatures ranging from 22° C. to 200° C. If heating is required to obtain a cured coating, temperatures of between 80° C. and a temperature above which the substrate is damaged due to heating, e.g., 80° C. to 200° C., are typically used. For example, certain organic polymeric materials may be heated up to 130° C. for a period of 1 to 16 hours in order to cure the coating without causing damage to the substrate. While a range of temperatures has been described for curing the coated substrate, it will be recognized by persons skilled in the art that temperatures other than those disclosed herein may be used. Additional methods for curing the photochromic polyanhydride coating composition include irradiating the coating with infrared, ultraviolet, visible, thermal, microwave, gamma or electron radiation so as to initiate the polymerization reaction of the polymerizable components in the coating. This may be followed by a heating step.

Preferably, the resulting cured coating meets commercially acceptable "cosmetic" standards for optical coatings. Examples of cosmetic defects of coated lens include pits, spots, inclusions, cracks and crazing of the coating. Most preferably, the coatings prepared using the photochromic coating composition of the present invention are substantially free of cosmetic defects.

Examples of polymeric organic materials that may be substrates for the coating composition of the present invention are polymers, i.e., homopolymers and copolymers, of the monomers and mixtures of monomers disclosed in U.S. Pat. No. 5,658,501 from column 15, line 28 to column 16, line 17, which is incorporated herein by reference.

Examples of such monomers and polymers include: polyol(allyl carbonate)monomers, e.g., diethylene glycol bis(allyl carbonate), which monomer is sold under the trademark CR-39; polyol(meth)acryloyl terminated carbonate monomer; diethylene glycol dimethacrylate monomers; ethoxylated phenol methacrylate monomers; diisopropenyl benzene monomers; ethoxylated trimethylol propane triacrylate monomers; ethylene glycol bismethacrylate monomers; poly(ethylene glycol)bis methacrylate monomers; urethane acrylate monomers; poly(ethoxylated bisphenol A dimethacrylate); poly(vinyl acetate); poly(vinyl alcohol); poly(vinyl chloride); poly(vinylidene chloride); polyurethanes, polythiourethanes, thermoplastic polycarbonates, such as the carbonate-linked resin derived from bisphenol A and phosgene, which is sold under the trademark LEXAN; polyesters, such as the material sold under the trademark MYLAR; poly(ethylene terephthalate); polyvinyl butyral; and poly(methyl methacrylate), such as the material sold under the trademark PLEXIGLAS and mixtures thereof.

More particularly contemplated, is the use of the combination of the photochromic polyanhydride coating composition of the present invention with polymeric organic materials such as optically clear polymerizates, i.e., materials suitable for optical applications, such as optical elements, e.g., plano and vision correcting ophthalmic lenses, windows, clear polymeric films, automotive transparencies, e.g., windshields, aircraft transparencies, plastic sheeting, etc. Such optically clear polymerizates may have a refractive index that may range from about 1.48 to about 1.75, e.g., from about 1.495 to about 1.66. Specifically contemplated are optical elements made of thermoplastic polycarbonates. Application of the photochromic polyanhydride coating composition of the present invention to a polymeric film in the form of an "applique", may be accomplished using the methods describe in column 17, line 28 to column 18, line 57 of U.S. Pat. No. 5,198,267.

Most particularly contemplated, is the use of the combination of the photochromic polyanhydride coating composition of the present invention with optical elements to produce photochromic optical articles. Such articles may be prepared by sequentially applying to the optical element a primer, the photochromic polyanhydride composition of the present invention and appropriate protective coating(s). The resulting cured coating preferably meets commercially acceptable "cosmetic" standards for optical coatings, and most preferably, is substantially free of cosmetic defects.

In another embodiment of the invention, the photochromic coating composition may be used to form polymerizates, e.g., shaped solid optically clear polymerizates, as defined herein with respect to polymeric organic materials. Polymerization of the coating composition may be accomplished by adding to the polymerizable composition a catalyst and curing in a manner appropriate for the specific composition and desired shape. The resulting polymerizate may have a thickness of 0.5 millimeters or more.

In one contemplated embodiment, a glass two-part lens mold is filled with desolvated photochromic coating composition, i.e., the polymerizable composition containing a minimal amount of solvent, which may additionally contain a catalytic amount of N,N-dimethyl dodecylamine. The glass mold is sealed and placed in a oven. A thermal polymerization cycle is initiated of 10 to 20 hours duration at about 45 to 90° C. Afterwards, the mold is opened and the resulting lens, i.e., polymerizate, is removed. The polymer lens thus produced is then annealed for a period and at a temperature sufficient to eliminate residual stresses in the lens. The temperature is generally between 100 and 120° C. and annealing is carried out for 1 to 5 hours. If the photochromic material was not included in the polymerizable composition, it may be incorporated into the polymerizate by imbibition, permeation or other transfer methods known to those skilled in the art.

In a further contemplated embodiment, a predetermined volume of the photochromic polymerizable composition of the present invention is dispensed into a volume defined by a spherical negative glass mold, which approximately matches the front surface curve (within ±0.05 diopters) and the outer diameter of a semi-finished single vision (SFSV) lens. The glass mold is fitted with a circular polyvinyl chloride gasket that extends approximately 0.2 millimeters above the mold and has an inside diameter approximately 4 millimeters less than outside diameter of the glass mold. After the monomer is dispensed, the SFSV lens is carefully placed on the dispensed polymerizable composition which spreads to fill the defined volume. A circular glass plate having an outside diameter equal to or greater than that of the lens is placed onto the rear surface of the lens. A spring clamp is positioned so that one side of the clamp is on the front surface of the negative mold and other side of the clamp is on the back surface of the glass plate. The resulting assembly is sealed by taping the circumference of the plate-lens-gasket-mold using polyurethane tape. The assembly is preheated in an air oven for 60 minutes at 32 to 95° C. Temperature is increased from 95° C. to 125° C. and decreased to 82° C. over a 3 hour interval. The assembly is separated by inserting a wedge beneath the gasket between the lens and mold. The lens now has an adherent layer of from 180 to 200 microns. If the photochromic material was not included in the polymerizable composition, it may be incorporated into the adherent layer by imbibition, permeation or other transfer methods known to those skilled in the art.

Both the polymerizate, i.e., lens, and the lens with the adherent layer, when tested for Fischer microhardness and photochromic performance properties as described in Part C of Example 8, will exhibit a Fischer microhardness of from at least 50 to less than or equal to 130 Newtons per mm$^2$ and a $\Delta$OD after 30 seconds of at least 0.15 and after 15 minutes, at least 0.50 and a bleach rate of no more than 200 seconds.

The present invention is more particularly described in the following examples, which are intended as illustrative only, since numerous modifications and variations therein will be apparent to those skilled in the art.

Composition A

The following materials were added in the order and manner described to a suitable reaction vessel equipped with an agitator, a reflux column, an addition funnel, nitrogen inlet, an internal temperature probe connected to an external electronic controller and a heating mantle.

| Materials | Weight (grams) |
|---|---|
| Charge 1 | |
| Methyl amyl ketone | 508.9 |
| Charge 2 | |
| Hydroxyl propyl methacrylate | 577.6 |
| Butyl methacrylate | 396.7 |
| Acrylic acid | 19.2 |
| Methyl methacrylate | 485.3 |
| ACE (1) | 96.3 |
| tertiary dodecyl mercaptan | 19.2 |
| Charge 3 | |
| Methyl amyl ketone | 380.0 |
| Di-tertiary-amyl peroxide | 144.5 |
| Charge 4 | |
| Methyl amyl ketone | 128.3 |
| Di-tertiary-amyl peroxide | 9.8 |
| Charge 5 | |
| Methyl amyl ketone | 83.5 |

(1) An acrylic monomer made by reacting equimolar amounts of acrylic acid and the glycidyl ester of versatic acid, available from Shell Chemical Company as "CARDURA E", using 0.1% zinc octoate as the catalyst.

Charge 1 was added to the reaction vessel; nitrogen was introduced into the vessel; the agitator was turned on; and heat was applied to the charge in the reaction vessel. When the charge reached the reflux temperature, Charges 2 and 3 were added simultaneously in a continuous manner over a period of 3.0 hours. Upon completing the addition of Charges 2 and 3, Charge 4 was added over a period of 1 hour. Upon completing the addition of Charge 4, the reaction mixture was held at reflux for 1 hour. Charge 5 was added and the contents of the reaction vessel were then cooled to room temperature. The resulting polymer solution had a calculated total solids content, based on total solution weight, of about 60%. The polymer had a weight average molecular weight, as measured by gel permeation chromatography using polystyrene as a standard, of about 4,567, and a hydroxyl value of about 170, based on polymer solid.

Composition B

A procedure comparable to that of Example 1 of U.S. Pat. No. 4,798,746 was followed to produce Composition B as herein described.

| Material | Weight (grams) |
|---|---|
| Charge 1 | |
| Ethyl-3-ethoxy propionate | 93.5 |
| Butyl acetate | 72.5 |
| Charge 2 | |
| Styrene | 234.0 |
| Maleic anhydride | 110.0 |
| Butyl acrylate | 78.0 |
| Methyl methacrylate | 78.0 |
| Ethyl-3-ethoxy propionate | 93.8 |
| Butyl acetate | 72.5 |
| Charge 3 | |
| LUPERSOL PMS ® (2) | 80.0 |
| Ethyl-3-ethoxy propionate | 34.2 |
| Charge 4 | |
| LUPERSOL PMS ® | 5.0 |
| Ethyl-3-ethoxy propionate | 26.6 |
| Charge 5 | |
| Butyl acetate | 21.7 |

(2) A 50 percent by weight solution of tertiary-butyl peroxy-2-ethylhexanoate in mineral spirits available from Pennwalt Corp.

Charge 1 is added to the reaction vessel; the agitator is turned on; and heat is applied to the charge in the reaction vessel. When the charge reaches the reflux temperature, about 142° C., Charges 2 and 3 are added simultaneously in a continuous manner over a period of 3.0 hours while the contents in the vessel are maintained at reflux conditions. Upon completing the addition of Charges 2 and 3, the reaction mixture is held at reflux for 1.0 hour. Charge 4 is added in a continuous manner over a period of thirty minutes and the reaction mixture is held at reflux for an additional 2.0 hours. Heating is discontinued and Charge 5 is added. The contents of the vessel are cooled to room temperature. The resulting polymer solution had a total solids content, measured after one hour at 110° C., of 54.5 percent by weight and an equivalent weight on solids of 450.

Composition C

The following materials were added in the order and manner described to a suitable reaction vessel equipped with an agitator, a reflux column, an addition funnel, nitrogen inlet, an internal temperature probe connected to an external electronic controller and a heating mantle:

| Material | Weight (grams) |
|---|---|
| Charge 1 | |
| Xylene | 340.1 |
| Charge 2 | |
| Glycidyl methacrylate | 720.0 |
| Cyclohexyl methacrylate | 360.0 |
| Butyl acrylate | 120.0 |
| Charge 3 | |
| Xylene | 110.0 |
| LUPERSOL 555 (M60)$^{(9)}$ | 40.0 |

| Material | Weight (grams) |
|---|---|
| Charge 4 | |
| Xylene | 17.0 |
| Di-tertiary amyl peroxide | 12.0 |

[9]A tertiary amyl peracetate available from E. I. Du Pont Company.

Charge 1 was added to the reaction vessel, nitrogen was introduced into the vessel, the agitator was turned on and heat was applied to the charge in the reaction vessel. When the charge reached the reflux temperature, Charge 3 was added continuously over a period of 3.5 hours. 5 minutes after initiating the addition of Charge 3, Charge 2 was added continuously over a period of 3.0 hours. Upon completing the addition of Charge 3, the reaction mixture was held at reflux conditions for 0.5 hours. Charge 4 was added continuously over a period of 0.5 hours, followed by holding the reaction mixture at reflux for 2.0 hours. The resulting polymer solution had a calculated total solids content, based on total solution weight, of about 70%. The polymer had a weight average molecular weight, measured by gel permeation chromatography using polystyrene as a standard, of about 7,652.

EXAMPLE 1

The following materials were added in the order escribed to a suitable vessel equipped with an agitator.

| Material | Weight (grams) |
|---|---|
| Charge 1 | |
| Composition A | 3.4552 |
| pTHF[3] | 1.7876 |
| Composition B | 6.6280 |
| Photochromic 1[4] | 0.6003 |
| NMP[5] | 1.5078 |
| Charge 2 | |
| Catalyst[6] | 0.2307 |

[3]Poly(oxytetramethylene)diol having a number average molecular weight of 1000 which is available from Great Lakes Chemical Corp.
[4]A photochromic naphtho[1,2-b]pyran that exhibits a blue color when irradiated with ultraviolet light.
[5]N-methylpyrrolidone solvent of 99% purity.
[6]N,N-Dimethyl dodecylamine was used as the Catalyst in ail of the examples and comparative examples, unless indicated otherwise.

After all of the materials in Charge 1 were added to the vessel, the agitator was turned on and mixed for 30 to 60 minutes. The resulting solution was kept quiescent for about 24 hours. Charge 2 was added and the solution was mixed for 30 to 60 minutes.

EXAMPLE 2

The following materials were added in the order described to a suitable vessel equipped with an agitator.

| Material | Weight (grams) |
|---|---|
| Charge 1 | |
| Composition A | 4.0112 |
| pTHF | 1.3976 |
| Composition B | 6.6500 |
| Photochromic 1 | 0.5981 |
| NMP | 1.5097 |
| Charge 2 | |
| Catalyst[6] | 0.2367 |

EXAMPLE 3

Step 1

The following materials were added in the order described to a suitable vessel equipped with an agitator.

| Material | Weight (grams) |
|---|---|
| Composition A | 33.4 |
| Composition B | 35.4 |
| NMP | 5.0 |

After all of the materials were added to the vessel, the agitator was turned on and mixed for 60 minutes.

Step 2

The following materials were added in the order described to a suitable vessel equipped with an agitator.

| Material | Weight (grams) |
|---|---|
| Product of Step 1 | 16.6 |
| BENZOFLEX ® P-200 plasticizer[7] | 1.0 |
| NMP | 1.0 |
| Photochromic 1 | 0.8 |
| Catalyst[6] | 0.3 |

[7]Polyethyleneglycol dibenzoate [CAS 9004-86-8] available from Velsicol Chemical Corporation.

After all of the materials were added to the vessel, the agitator was turned on and mixed for 60 minutes.

EXAMPLE 4

Step 1

The following materials were added in the order described to a suitable vessel equipped with an agitator.

| Material | Weight (grams) |
|---|---|
| pTHF | 20.4 |
| Composition A | 31.7 |
| NMP | 5.0 |

After all of the materials were added to the vessel, the agitator was turned on and mixed for 60 minutes.

Step 2

The following materials were added in the order described to a suitable vessel equipped with an agitator.

| Material | Weight (grams) |
|---|---|
| Product of Step 1 | 44.7 |
| Composition B | 52.6 |
| NMP | 5.0 |

After all of the materials were added to the vessel, the agitator was turned on and mixed for 60 minutes.

Step 3

The following materials were added in the order described to a suitable vessel equipped with an agitator.

| Material | Weight (grams) |
|---|---|
| Product of Step 2 | 15.3 |
| NMP | 1.0 |
| Photochromic 1 | 0.8 |
| Catalyst[(6)] | 0.3 |
| CYMEL ® 202 resin[(8)] | 1.2 |

[(8)]A methylated-butylated melamine formaldehyde resin available from Cytec Industries, Inc.

After all of the materials were added to the vessel, the agitator was turned on and mixed for 60 minutes.

EXAMPLE 5

The procedure of Step 3 of Example 4 was followed except that 15.3 grams of the product of Step 2 was used and 2.4 grams of CYMEL® 202 resin was used

EXAMPLE 6

The procedure of Step 3 of Example 4 was followed except that CYMEL® 202 resin was replaced with 1.4 grams of Composition C.

EXAMPLE 7

Step 1

The following materials were added in the order

| Materials | Weight (grams) |
|---|---|
| pTHF | 2.7 |
| Composition A | 4.1 |
| NMP | 1.0 |

After all of the materials were added to the vessel, the agitator was turned on and mixed for 60 minutes.

Step 2

The following materials were added in the order described to a suitable vessel equipped with an agitator.

| Materials | Weight (grams) |
|---|---|
| Product of Step 1 | 7.8 |
| Composition B | 8.8 |

-continued

| Materials | Weight (grams) |
|---|---|
| Composition C | 4.2 |
| Photochromic 1 | 0.8 |
| NMP | 1.0 |
| Catalyst[(6)] | 0.3 |

After all of the materials were added to the vessel, the agitator was turned on and mixed for 60 minutes.

COMPARATIVE EXAMPLE 1

The following materials were added in the order described to a suitable vessel equipped with an agitator.

| Materials | Weight (grams) |
|---|---|
| Charge 1 | |
| Composition A | 4.3924 |
| pTHF | 1.2170 |
| Composition B | 6.6362 |
| Photochromic 1 | 0.6020 |
| NMP | 1.5080 |
| Charge 2 | |
| Catalyst[(6)] | 0.2296 |

COMPARATIVE EXAMPLE 2

The procedure of Step 2 of Example 3 was followed except that 18.5 grams was used of the product of Step 1 and no BENZOFLEX® P-200 plasticizer was added.

COMPARATIVE EXAMPLE 3

The procedure of Step 3 of Example 4 was followed except that 17.0 grams was used of the product of Step 2 and CYMEL® 202 resin was not added.

EXAMPLE 8

Part A

The solutions prepared in Examples 1–7 and Comparative Examples 1–3 were applied via a spincoating method to lens blanks made of CR-39® monomer. Prior to application of the coating, each lens blank was washed with detergent, rinsed with water, immersed for 20 minutes in an aqueous 40 weight percent sodium hydroxide solution which was maintained at 23–25° C. and then washed with detergent and rinsed with water. The solutions were dispensed onto each lens which was spinning at 1500 rpm for the time periods listed in Table 1. The variety of times listed in Table 1 were used to obtain the proper coating thicknesses of about 20 microns and UV absorbances of from about 1.8 to about 2.2 at 390 nanometers. Different time periods were used due to differences in solution viscosity of the Examples and Comparative Examples. The lenses coated with the solution of Examples 1, 2 and CE 1 were cured for 60 minutes in a convection oven maintained at 140° C. All of the other coated lenses were cured for 30 minutes at 140° C.

Part B

The photochromic coated test samples prepared in Part A were subjected to microhardness ($F_h$) testing using a Fischerscope HCV, Model H-100 available from Fischer Technology, Inc. The microhardness, measured in Newtons (N) per mm², of the coated test samples was determined by taking at least 1 measurement at a depth of 2 microns in the center 20 area of the test sample prepared for each Example under the conditions of a 100 milliNewton load, 30 load steps and 0.5 second pauses between load steps. The test results are listed in Table 2.

Part C

The photochromic coated test samples prepared in Part A were tested for photochromic response on an optical bench. Prior to testing on the optical bench, the photochromic test samples were exposed to 365 nanometer ultraviolet light for about 20 minutes to activate the photochromic compounds and then placed in a 75° C. oven for about 20 minutes to bleach (inactivate) the photochromic compounds. The coated test samples were then cooled to room temperature, exposed to fluorescent room lighting for at least 2 hours and then kept covered for at least 2 hours prior to testing on an optical bench. The bench was fitted with a 300 watt Xenon arc lamp, a remote controlled shutter, a Schott 3 mm KG-2 band-pass filter, which removes short wavelength radiation, neutral density filter(s), a quartz plated water cell sample holder for maintaining sample temperature in which the test sample to be tested was inserted.

The power output of the optical bench, i.e., the dosage of light that the sample test sample would be exposed to, was adjusted to 0.67 milliwatts per square centimeter (mW/cm²) using a GRASEBY Optronics Model S-371 portable photometer (Serial #21536) with a UV-A detector (Serial #22411). The UV-A detector was placed into the sample holder and the light output was measured. Adjustments to the power output were made by increasing or decreasing the lamp wattage or by adding or removing neutral density filters in the light path.

A monitoring, collimated beam of light from a tungsten lamp was passed through the sample at 30° normal to the surface of the lens. After passing through the lens, the light from the tungsten lamp was directed through a 570 nanometer (nm) filter attached to a detector. The 570 nm filter passes wavelengths characteristic of the photochromic compound used in the examples. The output signals from the detector were processed by a radiometer. The control of the test conditions and acquisition of data was handled by the Labtech Notebook Pro software and the recommended I/O board.

Change in optical density (ΔOD) from the bleached state to the darkened state was determined by establishing the initial transmittance, opening the shutter from the Xenon lamp to provide ultraviolet radiation to change the test sample from the bleached state to an activated (i.e., darkened) state at selected intervals of time, measuring the transmittance in the activated state, and calculating the change in optical density according to the formula: ΔOD= log(% Tb/% Ta), where % Tb is the percent transmittance in the bleached state, % Ta is the percent transmittance in the activated state and the logarithm is to the base 10.

The ΔOD was measured using a 570 nanometer filter after the first thirty (30) seconds of UV exposure and then after fifteen (15) minutes with the optical bench maintained at a temperature of 72° F. (22° C.). The Bleach Rate (T ½) is the time interval in seconds for the ΔOD of the activated form of the photochromic compound in the coated test samples to reach one half the highest ΔOD at (72° F., 22° C.) after removal of the source of activating light. Results for the photochromic coated test samples for each Example are listed in Table 3.

TABLE 1

| Example No. | Spin Time (seconds) |
| --- | --- |
| 1, 2, 7 and CE1 | 7 |
| 3, 4 and CE2 | 8 |
| 5 and 6 | 11 |
| CE3 | 5 |

TABLE 2

| Example No. | Fischer Microhardness (Newtons per mm²) |
| --- | --- |
| 1 | 56 |
| 2 | 116 |
| 3 | 66 |
| 4 | 59 |
| 5 | 89 |
| 6 | 63 |
| 7 | 77 |
| CE1 | 137 |
| CE2 | 155 |
| CE3 | 15 |

TABLE 3

| Example No. | 72° F. ΔOD @ 30 seconds | 72° F. ΔOD @ 15 minutes | 72° F. T ½ (seconds) |
| --- | --- | --- | --- |
| 1 | 0.29 | 0.86 | 97 |
| 2 | 0.20 | 0.81 | 187 |
| 3 | 0.22 | 0.93 | 188 |
| 4 | 0.28 | 0.75 | 102 |
| 5 | 0.21 | 0.64 | 134 |
| 6 | 0.35 | 0.76 | 74 |
| 7 | 0.34 | 0.76 | 76 |
| CE1 | 0.15 | 0.75 | 257 |
| CE2 | 0.04 | 0.37 | >900 |
| CE3 | 0.35 | 0.80 | 70 |

The results of Tables 2 and 3 show that the lenses with the solutions of Examples 1 through 7 had microhardness results ranging from 56 to 116 Newtons/mm², demonstrated ΔOD of at least 0.20 after 30 seconds, and at least 0.64 after 15 minutes, and had a fade rate of 188 seconds or less, all tested at 72° F. (22° C.) The results for Comparative Example 1, which has a 70:30 weight ratio of Composition B to Composition A, as compared to the results for Example 1 which has a 55/45 weight ratio and Example 2 which has a 65/35 weight ratio, demonstrated an under high Fischer microhardness but the T1/2 was greater than 200 seconds. The results for Comparative Example 2 compared to those of Example 3, which is the same composition as Comparative Example 2 except for the addition of 20 weight percent plasticizer, do not fall within either the preferred ranges of physical or photochromic performance properties.

The Fischer microhardness result for the lens coated with Comparative Example 3 compared to Examples 4 and 5, which are the same formulations as Comparative Example 3 except for 10 and 20 weight percent melamine resin, respectively, and compared to Examples 6 and 7, which are also the same as CE3, except for 20 and 30 weight percent epoxy resin, respectively, is far below the desired lower level of 50 Newtons/mm².

Although the present invention has been described with reference to the specific details of particular embodiments thereof, it is not intended that such details be regarded as limitations upon the scope of the invention except as and to the extent that they are included in the accompanying claims.

We claim:

1. An article comprising, in combination, a substrate and a photochromic polyanhydride coating on at least one surface of said substrate, said photochromic polyanhydride coating being prepared from components comprising: (a) the reaction product of hydroxyl-functional component(s), and polymeric anhydride-functional component(s) and (b) a photochromic amount of photochromic compound(s), said components being used in such proportions to produce a photochromic coating having a Fisher microhardness of at least 50 and not more than 130 Newtons per mm$^2$, and photochromic properties characterized by a $\Delta$OD of at least 0.15 after 30 seconds and at least 0.50 after 15 minutes, and a bleach rate of not more than 200 seconds –all as measured at 72° F.

2. The article of claim 1 wherein the Fisher microhardness of said coating is at least 70 and not more than 110 Newtons per mm$^2$, the $\Delta$OD is at least 0.18 after 30 seconds and at least 0.63 after 15 minutes, and the bleach rate is not more than 190 seconds.

3. The article of claim 1 wherein the photochromic polyanhydride coating comprises:
   (a) the reaction product of (i) hydroxyl-functional component(s) having at least two hydroxyl groups and a number average molecular weight of 62 to 50,000, and (ii) polymeric anhydride-functional component(s) having an average of at least two cyclic carboxylic acid anhydride groups and a number average molecular weight of 1000 to 50,000, the ratio of equivalents of hydroxyl groups of (i) to anhydride groups of (ii) being from 1.0:3.0 to 3.0:1.0; and
   (b) a photochromic amount of photochromic material.

4. The article of claim 1 wherein the photochromic polyanhydride coating further comprises a catalytic amount of catalyst for accelerating the curing reaction between the hydroxyl groups of (i) and anhydride groups of (ii).

5. The article of claim 4 wherein the catalyst is dimethylcocoamine, dimethyl dodecylamine, triethylamine, triethanolamine, or mixtures of said catalysts.

6. The article of claim 1 wherein the photochromic polyanhydride coating further includes crosslinking agents, plasticizers or mixtures of crosslinking agents and plasticizers.

7. The article of claim 6 wherein the crosslinking agents are polyepoxides, acrylamide-functional polymers, polyisocyanates or melamine formaldehyde resins and the plasticizers are benzoate esters.

8. The article of claim 1 wherein the hydroxyl-functional component is polyacrylic polyol, polyester polyol, urethane polyol, polyether polyol or mixtures of said polyols.

9. The article of claim 8 wherein the hydroxyl-functional component is polyacrylic polyol, polyether polyol or a mixture of said polyols.

10. The article of claim 9 wherein the polyacrylic polyol is a co-polymer of ethylenically unsaturated monomer(s) having at least two hydroxyl groups and at least one polymerizable ethylenically unsaturated monomer which is free of hydroxyl groups.

11. The article of claim 1 wherein the polymeric anhydride-functional component is derived from a mixture of monomers comprising at least 11 percent by weight of an ethylenically unsaturated monomer having carboxylic acid anhydride functionality and other ethylenically unsaturated monomers substantially free of anhydride functionality.

12. The article of claim 11 wherein the ethylenically unsaturated monomers free of anhydride functionality are esters of (meth)acrylic acids, vinyl monomers, styrene or mixtures of such monomers.

13. The article of claim 11 wherein the carboxylic acid anhydride functionality is provided by itaconic anhydride, citraconic anhydride, maleic anhydride or mixtures of said anhydrides.

14. The article of claim 1 wherein the photochromic material comprises:
   (a) at least one photochromic compound having a visible lambda max of from 400 nanometers to 525 nanometers; and
   (b) at least one photochromic compound having a visible lambda max of from greater than 525 nanometers to 700 nanometers.

15. The article of claim 14 wherein the photochromic compound(s) are benzopyrans, naphthopyrans, phenanthropyrans, quinopyrans, indeno-fused naphthopyrans, benzoxazines, naphthoxazines, spiro (indoline)pyridobenzoxazines, metal-dithizonates, fulgides, fulgimides or mixtures thereof.

16. The article of claim 1 wherein the photochromic polyanhydride coating has a thickness of from 5 to 200 microns.

17. The article of claim 16 wherein the photochromic polyanhydride coating has a thickness of from 10 to 40 microns.

18. The article of claim 1 wherein said substrate is paper, glass, ceramic, wood, masonry, textile, metal or polymeric organic materials.

19. The article of claim 18 wherein the polymeric organic material is a solid transparent polymer selected from the group consisting of poly(methyl methacrylate), poly (ethylene glycol bismethacrylate), poly(ethoxylated bisphenol A dimethacrylate), thermoplastic polycarbonate, poly (vinyl acetate), polyvinylbutyral, polyurethane, polythiourethanes, and polymers of members of the group consisting of diethylene glycol bis(allyl carbonate) monomer, diethylene glycol dimethacrylate monomer, ethoxylated phenol methacrylate monomer, diisopropenyl benzene monomer, ethoxylated trimethylol propane triacrylate monomer and mixtures thereof.

20. The article of claim 19 wherein said substrate is an optical element.

21. The article of claim 20 wherein said optical element is a lens.

22. The article of claim 21 wherein the refractive index of said lens is from 1.48 to 1.75.

23. A photochromic article comprising the polymerizate of a polymerizable composition comprising (a) the reaction product of hydroxyl-functional component(s) and polymeric anhydride-functional components(s) and (b) a photochromic amount of a photochromic material, said polymerizate exhibiting a Fischer microhardness of at least 50 and not more than 130 Newtons per mm$^2$, and photochromic properties characterized by a $\Delta$OD of at least 0.15 after 30 seconds and at least 0.50 after 15 minutes, and a bleach rate of not more than 200 seconds—all tested at 72° F.

24. The photochromic article of claim 23 wherein said polymerizable composition further comprises a catalytic amount of catalyst.

25. The photochromic article of claim 23 wherein said article is a lens.

26. The photochromic article of claim 23 wherein said article has a thickness of at least 0.5 millimeters.

* * * * *